United States Patent

Casten

[11] 3,885,316
[45] May 27, 1975

[54] NAVIGATIONAL INSTRUMENT
[76] Inventor: Ray J. Casten, 143 Walnut St., Natick, Mass. 01760
[22] Filed: Apr. 19, 1973
[21] Appl. No.: 352,523

[52] U.S. Cl. ............ 33/75 R; 33/1 SD; 33/107 CB; 33/192
[51] Int. Cl. ............................................. G06g 1/02
[58] Field of Search ............ 33/1 SP, 107 CB, 75 R, 33/1 SB, 192, 150

[56] References Cited
UNITED STATES PATENTS

| | | | |
|---|---|---|---|
| 819,495 | 5/1906 | Allen | 33/192 |
| 819,926 | 5/1906 | Robbins | 33/192 |
| 1,019,139 | 3/1912 | Eberley | 33/192 |
| 2,641,844 | 6/1953 | Worley | 33/75 R |
| 3,118,233 | 1/1964 | Mesa | 33/192 |
| 3,196,543 | 7/1965 | Casten | 33/75 R |
| 3,280,464 | 10/1966 | Warner | 33/75 R |

*Primary Examiner*—Harry N. Haroian
*Assistant Examiner*—John W. Shepperd
*Attorney, Agent, or Firm*—Robert T. Gammons

[57] ABSTRACT

A navigational instrument comprising an elongate structure of transparent plastic material having a top wall, side walls along the long sides thereof and end walls. The side walls are parallel and together with the end walls define a cavity beneath the top wall which is open at the bottom. A rigid rod is mounted in the cavity on which there are mounted for movement lengthwise thereof pairs of pointers. A scale bar is also mounted in the cavity parallel to the rigid bar and the pairs of pointers are disposed in the cavities so that one pointer of each pair travels along the scale bar and the other travels along beneath the scale bar in the plane of the bottom opening of the instrument substantially in engagement with the surface of the chart on which the instrument rests. Lazy tong linkage connect the adjacent pairs of pointers for movement equal distances along the instrument in either direction and there are means at the ends of the linkage to resist one or the other end for movement while the other, on the one hand, is being moved to extend or contract the linkage. A compass rose and variation scale plate are employed in conjunction with the instrument and there is a spring clip for removably mounting the compass rose and variation scale plate at one long side of the instrument for movement in unison along that side and for rotation of the compass rose about an axis perpendicular to the scale plate and instrument.

18 Claims, 13 Drawing Figures

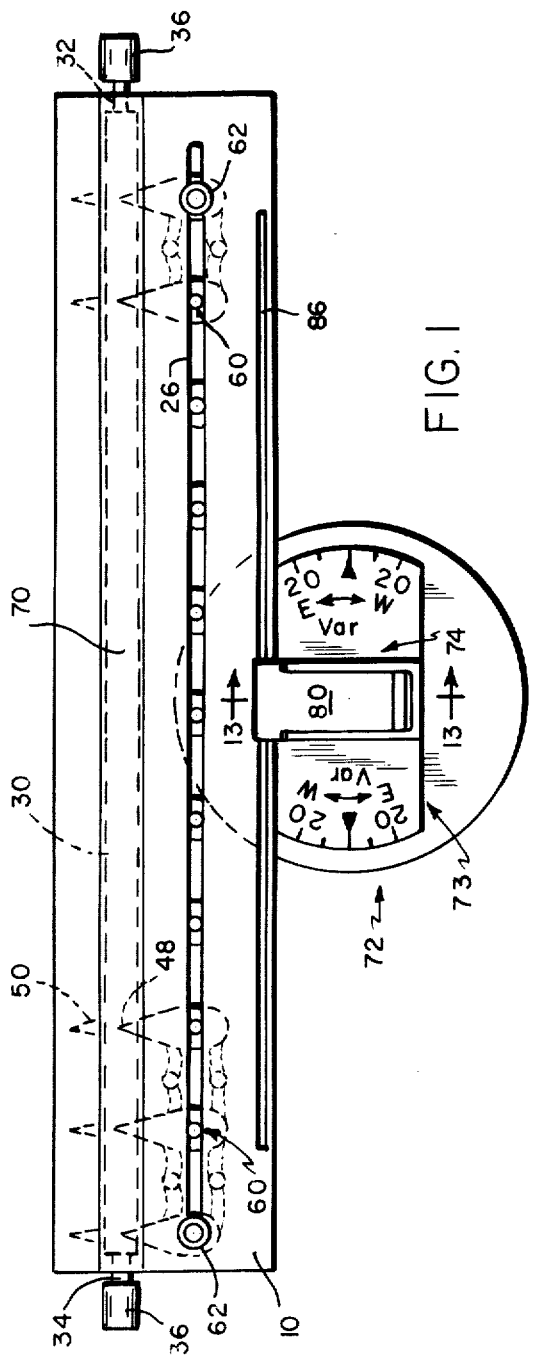
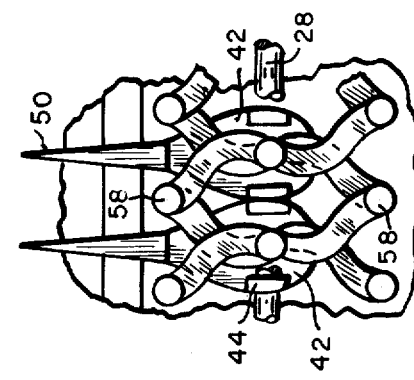
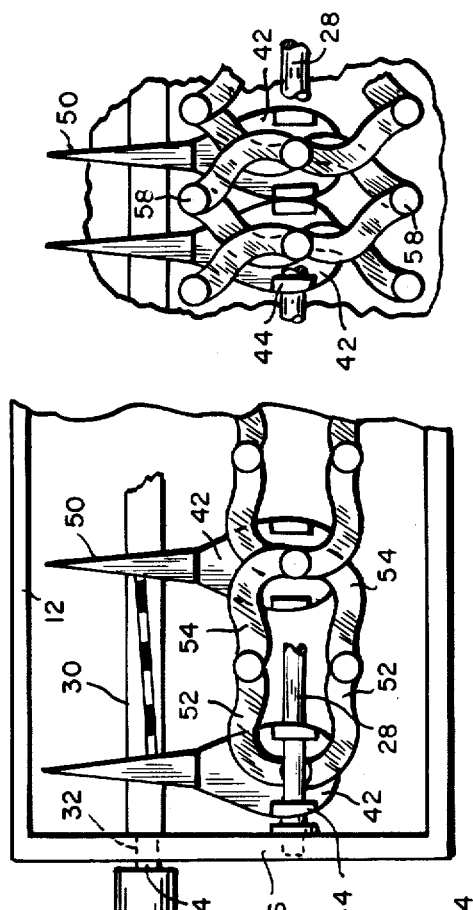
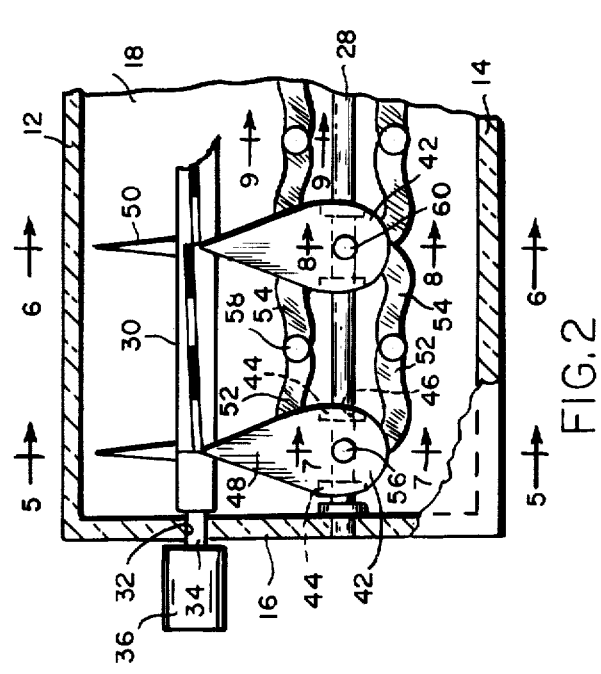
FIG. 1
FIG. 2
FIG. 3
FIG. 4

PATENTED MAY 27 1975 3,885,316

NAVIGATIONAL INSTRUMENT

BACKGROUND OF THE INVENTION

In my U.S. Pat. Nos. 2,871,567 and 3,196,543, there are shown navigational instruments designed to facilitate plotting courses followed by ships, planes and other vehicles for the purpose of keeping track constantly of the present and future positions, to predict future positions, locate landmarks and navigational aids and provide information required for tactical problems and the like. These instruments contain pointers arranged along a straight line on a supporting ruler-like structure made of transparent material for movement along a scale bar on which there are inscribed one or more time-distance scales and there is provided lazy tong linkage for effecting movement of the pointers equal distances along the scale bar in either direction. The navigational instrument herein illustrated constitutes an improvement on the instruments shown in the aforesaid patents and in particular is constructed and designed to provide for minimizing risk of parallax when determining the position of the pointer on the scale and the corresponding position on the chart; to facilitate interpolation between values on the scale; to insure parallelism between pointers; to eliminate backlash in the lazy tong linkage and hence error; to provide for maximum expansion and contraction of the linkage without binding; to enable use of the pointer linkage from either end of the instrument; to provide reciprocal scales suitable for different units of measurement; to eliminate any effects of temperature and degree of wetness or dryness on the accuracy of the instrument; to enable easily moving the instrument along a chart or map and orienting it at a predetermined position with respect to the true and magnetic attitudes; to easily correct from true to magnetic and from magnetic to true attitudes; and to provide for ease of manufacture and maintenance.

SUMMARY

A navigational instrument comprising an elongate structure having along the long sides and ends, side and end walls which collectively define an elongate cavity at the underside of the top wall, a rigid rod mounted within the cavity at the underside of the top wall with its opposite ends journaled in the end walls, a scale bar mounted in the cavity at the underside of the top wall parallel to the rigid rod with its ends journaled in said end walls, said scale bar being rotatable to dispose a selected scale uppermost, a series of scale pointers slidingly mounted on the rigid rod transverse to the scale bar for movement along the rigid rod relative to the indicia on the scale bar, links of equal length between each pair of pointers pivotally connected at one end to the pointers and at their other ends to each other and forming in conjunction with the pointers a lazy tong device which operates to move the pointers equal distances along the scale bar, and means associated with the pointers at opposite ends of the lazy tong device frictionally binding the end pointers to the rigid rod so that either end may be extended relative to the other without displacing the other on the rigid rod. The bottom of the cavity is open and the lower edges of the side and end walls provide support for sliding the instrument along the surface of the chart. The pointers comprise in addition to the scale pointers chart pointers and means supporting the chart pointers in the bottom opening substantially in the plane of the lower edge of the side and end walls for movement along the surface of the chart in consonance with the movement of the scale pointers along the scale bar. The chart pointers extend forwardly of the scale pointers so that the pointers of each pair of pointers can be observed simultaneously. The top wall contains a slot longitudinally thereof parallel to and above the rigid rod and the means for frictionally binding the end pointers comprise pins extending upwardly from the pointers at the opposite ends of the lazy tong device through the slot on which are mounted knobs which are yieldably pressed into engagement with the top surface of the top member. The scale bar is of rectangular cross-section having four longitudinally extending flat surfaces on which are inscribed repeat time-distance scales and there is means for rotating the scale bar to selectively present a scale corresponding to that of the chart with which the instrument is being used. A lens is provided along the top in alignment with the scale bar to facilitate reading. Pointer blocks slidingly support the integral pointers on the rigid rod and there are pairs of links of equal length between each pair of pointer blocks, — the pairs of links at one end being pivotally connected to the pointer blocks and at their other ends to each other, the pointers being provided with an offset configuration such that in the contracted condition of the device the links are contained within the space between the abutting pointer blocks and in the extended position the links clear the supporting arms of the pointer blocks. Pivot pins connect the ends of the pairs of links to the pointer blocks and these extend upwardly through the longitudinal slot, the latter being wider than the diameter of these pins so as to permit freedom of movement along the slot without binding. A compass rose and variation scale plate are detachably mounted by clamping means having spring-pressed jaws engaged with spaced parallel grooves at one long side for movement in unison along that side. The compass rose is rotatably mounted on the clamp in a plane parallel to the lower side of the instrument and scale plate for rotation about an axis perpendicular to the instrument. The variation plate has spaced parallel sides parallel to the instrument and arcuate ends concentric with the center of rotation of the compass rose and is mounted in fixed relation to the instrument so that its sides always remain parallel to the longitudinal axis of the instrument.

The invention will now be described in greater detail with reference to the accompanying drawings wherein:

FIG. 1 is a plan view of the navigational instrument of this invention with a compass rose and variation scale detachably mounted at one long edge for movement in unison therealong;

FIG. 2 is a fragmentary horizontal section through the instrument at one end taken in a plane above the scale pointers;

FIG. 3 is a fragmentary view at one end of the instrument as seen from the bottom side;

FIG. 4 is a fragmentary elevation of the pointer mechanism in its retracted space;

Figure 10:
FIG. 10 is a plan view of the scale bar broken away in part.

Referring to the drawings (FIGS. 1, 5 and 6), the instrument is comprised of a transparent plastic, for example nylon or an equivalent material, molded or fabricated to shape and comprises an elongate top wall 10 along the opposite long sides of which are side walls 12 and 14 and at the ends of which there are end walls 16—16. The side walls 12 and 14 are parallel and form spaced parallel edges lengthwise of the instrument and in conjunction with the end walls define a recess 18 closed at the top and sides and open at the bottom. The lower edges of the side and end walls except for a portion of the rear wall 22 which is recessed intermediate its ends for receiving a portion of the compass rose, as will appear hereinafter, lie in the same plane and constitute a support on which the instrument rests for sliding over the surface of a chart or map.

Figure 11:
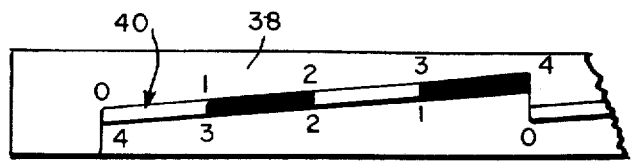
FIG. 11 is an enlarged fragmentary plan view of a portion of the scale bar at one end.

The top wall 10 contains longitudinally thereof a narrow slot 26 and below this slot within the recess 18 there is mounted in a horizontal position a rigid rod 28, the opposite ends of which are fixed in the end walls 16—16 of the instrument. A scale bar 30 is also mounted in the recess in spaced parallel relation to the rod 28 with its ends journaled in openings 32—32 in the end walls 16—16 so that it may be rotated and has for this purpose at its ends pins 34—34 which extend through the openings and have fixed thereto knobs 36. The scale bar 30 (FIGS. 10 and 11) is of rectangular cross-section having four longitudinally extending flat surfaces 38 and on each surface there is a scale 40 comprising unit lengths representing time-distance measurements which repeat lengthwise of the scale bar and are offset at corresponding angles to the axis of the scale bar. Each unit length is divided into equal subunits and is reciprocably numbered to enable reading from either end. The unit of time-distance measurement may be assigned whatever values are expedient or appropriate to the use of the instrument, for example, for ship navigation the intervals may represent the distance the ship travels every 6 minutes.

Pointers are mounted on the bar 28 for movement therealong relative to the scale bar, the bar 28 providing for mounting the pointers in accurate alignment. Each pointer comprises a block 42 having at its lower side spaced parallel bearing arms 44—44 containing registering openings 46—46 by means of which they are slidingly mounted on the rigid bar 28. Each block has a horizontal, forwardly extending pointer element 48 which is situated above the scale bar and a horizontal, forwardly extending pointer element 50 situated below the scale bar substantially in the plane of the lower edges of the side and end walls so as to lie close to the surface of the chart or map on which the instrument rests. The chart pointers 50, as illustrated in FIGS. 1 and 2, extend forwardly of the forward ends of the scale pointers 48 so that the position of the scale pointers on the scale and the position of the chart pointers on the chart can be seen simultaneously. This arrangement of the pointers reduces parallax and facilitates interpolation between values on the scale.

The pairs of pointers are integral and supported in uniformly spaced relation to each other for movement along the rigid bar 28 equal distances by pairs of links 52—52 and 54—54 (FIGS. 2, 3 and 4). The links 52—52 are pivotally connected at one end by a pivot pin 56 midway between the bearing arms 44—44 and at their opposite ends midway between adjacent blocks by pins 58—58 to the links 54—54. The links 54—54 in turn are pivotally connected at their opposite ends to the next block by a pivot pin 60. The structure comprising the pointer blocks and links constitutes a lazy tong device which may be extended and contracted to move the pointers along the scale bar equal distances in either direction and will maintain the pointers in position at equal distances from each other.

Figure 5:
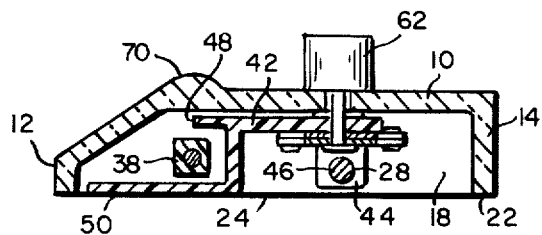
FIG. 5 is a vertical section taken transversely of the instrument on the line 5—5 of FIG. 2 with parts in elevation.
Figure 6:
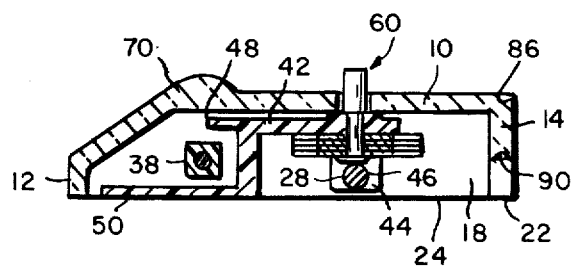
FIG. 6 is a transverse section taken on the line 6—6 of FIG. 2 with parts in elevation.
Figures 7, 8:
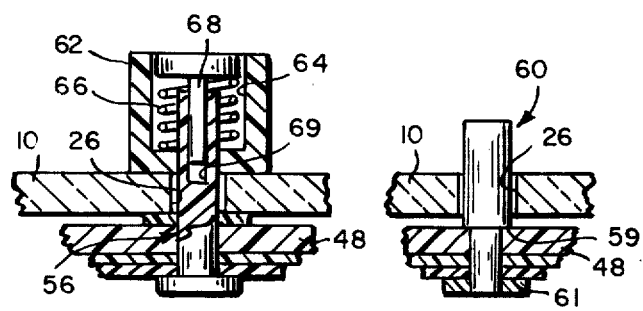
FIG. 7 is a transverse section taken on the line 7—7 of FIG. 2.
FIG. 8 is an enlarged fragmentary view of the pivot pin shown in FIG. 6.
Figure 13:
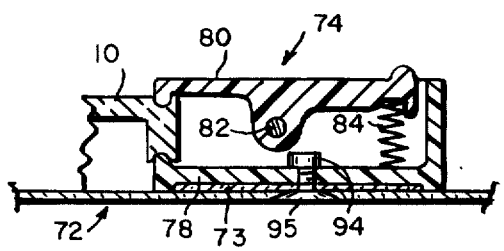
FIG. 13 is a fragmentary section showing the assembly for slidingly attaching the compass rose and variation scale plate to the instrument taken on the line 13—13 of FIG. 1
Figure 9:
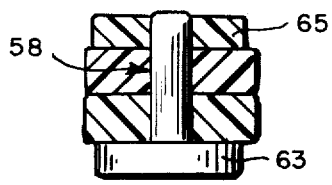
FIG. 9 is an enlarged fragmentary section on the line 9—9 of FIG. 2.

The pivot pins 56—56 on the pointer blocks at opposite ends of the lazy tong device (FIG. 7) extend upwardly through the slot 26 through knobs 62—62 (FIGS. 5 and 7). The knobs contain openings 64 of larger diameter than the pivot pins 56 in which are mounted around the pivot pins coil springs 66—66, the latter being retained within the openings by pins 68—68 pressfitted into holes 69—69 in the upper ends of the pivots 56—56. The springs force the knobs down against the upper surface of the top and frictionally resist displacement of the end pointer blocks along the rod 28. By suitable adjustment the frictional engagement of the knobs with the top they can be made to hold either end undisplaced while the other is moved relative to the one end. The pivot pins 60 (FIG. 8) between those at the end of the linkage extend upwardly through the slot 26 and have shoulders 59 held engaged with the tops of the blocks 48 by washers 61 press-fitted onto their lower ends. The slot 26 is wider than the diameters of both the pins 56 and 60 so that they are free to move along the slot without binding. The pins 58 which join the links between the pointer blocks (FIG. 9) have heads 63 at their lower ends which are held in place by washers 65 press-fitted to their upper ends.

To provide for smooth, substantially frictionless and uniform movement of the pointers along the scale the linkage is comprised of thin, uniformly flat plastic material. The pins 56, 58 and 60 are made to as large a diameter as possible, for example approximately one-fourth inch in diameter. The distance between the bearing arms 44—44 should be approximately one-half inch.

The scales 40 on the several flat surfaces of the scale bar have relatively small graduations and so the top wall 10 of the instrument is provided with a lens 70 which extends lengthwise of the instrument above the scale. The lens may be formed integral with the material of the instrument or may be a strip applied or welded to the top 10 of the instrument. The forward side wall 12 of the instrument is sloped to facilitate reading the position of the chart scale situated below it.

Figure 12:
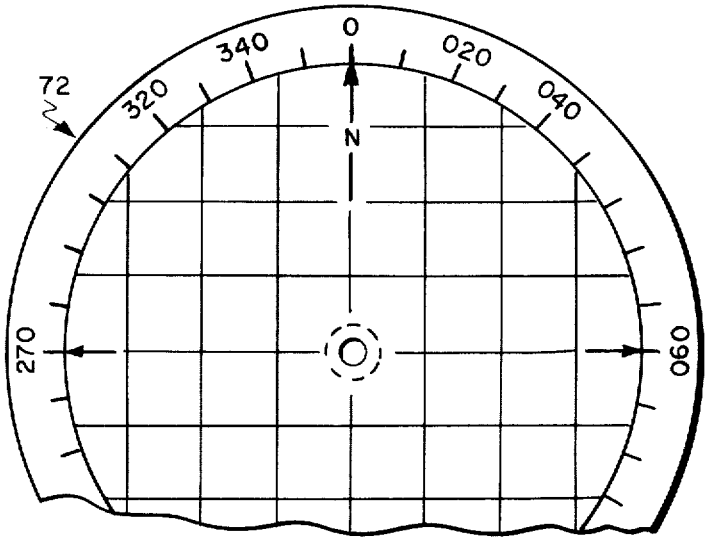
FIG. 12 is a plan view of the compass rose constructed to be used with the scale.

A compass rose 72 and variation scale plate 73 are mounted at one long edge of the instrument for movement in unison along that edge and for rotation of the compass rose about a vertical axis perpendicular to the instrument and to the scale plate by mounting means 74. The mounting means 74 comprises a lower jaw 78 and an upper pivotally mounted jaw 80, the upper jaw 80 being supported by a pin 82 and yieldably biased toward the lower jaw by a spring 84. The upper surface of the top 10 of the instrument along the side wall 14 contains a longitudinally extending groove 86. The wall 14 has along its lower edge an upwardly extending recessed edge 88 (FIG. 6) containing a groove 90. The jaws 80 and 78 are adapted to be engaged with the grooves 86 and 90 to slidingly support the mounting means for movement along the instrument. The variation scale plate 73 has spaced parallel sides and arcuate ends concentric with the center of rotation of the compass rose and is recessed into the lower side of the lower jaw so that its edges are parallel to the long side of the instrument. The variation scale is comprised of transparent material and at the arcuate ends there are scales labeled E-Var-W and W-Var-E. The compass rose 72 (FIG. 12) is pivotally mounted to the lower side of the scale plate 73 and the jaw 78 by a screw-threaded pin 94 for rotation about a vertical axis perpendicular to the instrument. The threaded end of the pin has on it a threaded friction nut 95 which enables frictionally engaging the compass rose against the underside of the plate 73. The compass rose may thus be moved to any desired position lengthwise of the instrument and at any given position rotated about an axis perpendicular to the chart on which the instrument rests. The compass rose comprises a transparent disc made of the same material as that of the instrument and has peripherally of its marginal edge graduation marks representing the point of the compass.

The instrument as herein described provides within a single device all the essentials and capabilities to most effectively select, evaluate and apply available piloting and navigational information. The precisely designed variable time scale operates in conjunction with universal-type chart scales to accurately relate present and projected time, speed and distance relationship. These are in turn related to compass true and magnetic values through the compass rose and variation scale plate which are accurately marked to show the true index and related variation values up to 25° east or west for complete directional reference since the true index in conjunction with variation markings permits rapid simultaneous and errorless conversion between magnetic compass and true chart values, thus bearing observations, steering values and magnetic values are easily translated to their corresponding true values required for chart plotting. Conversely chart values are quickly translated into magnetic values. This now permits rapid grid alignment to longitude, latitude reference, all of which can be accomplished without interference or necessity for displacement of the instrument from its own related track, chart of bearing aid reference points. The traversing feature of the compass rose and variation scale plate enables compass alignment independently of and without interference with optimum positioning of the navigational instrument, that is, when engaged in plotting lines or position (bearings) or relating the index or other pointer of the variable time scale to a specific chart position or reference point.

The scale bar 30 provides four optionally selectable two-way scales arranged in stepped relation which enables rapidly switching from one chart scale to another as when transitioning from a coastal chart to a harbor chart. Four such scales are shown; however, for added versatility the scale bar is readily removable for substitution of different scale bars carrying other preselected series of scales, for example world wide coverage can be easily provided to accommodate all chart scales.

As previously pointed out the upper scale time-distance pointers follow the scale on the scale bar and the lower scale (chart position) pointers pass beneath the scale bar in direct vertical alignment but extending forwardly sufficiently to appear visibly along the plotted course or track line of the chart for very accurate comparison. This arrangement eliminates the possibility of parallax and increases the operator accuracy to interpolate between pointer values.

As also related above the pointer blocks establish minimum pointer spacing, a value determined as sufficient to insure pointer perpendicularity to the mounting rod, establish linkage stability, yet not exceed one-half of the maximum extended length so as to permit time increments doubling between pointers to obtain substantially full scale coverage. The shape of the links prevent pinching of the chart pointer supporting arms between adjacent links. The length of the longitudinal slot limits the length and number of links and establishes the maximum extended position. The objective is to establish limits so as to constrain the lazy tong mechanism to operate with minimum stress and at optimum effectiveness for uniformly translating linear pointer motion. As designed the linkages minimize backlash, slap, twist or lag and friction between the inner faces and the bearing pins are large enough to prevent excessive play.

It should be understood that the present disclosure is for the purpose of illustration only and that this invention includes all modifications and equivalents falling within the scope of the appended claims.

I claim:

1. A navigational instrument comprising an elongate top wall along the long sides and ends of which there are side and end walls, the side walls being parallel and in conjunction with the end walls defining an elongate cavity at the underside of the top wall, said top wall containing lengthwise thereof and parallel to said side walls a slot of predetermined width, a rigid rod mounted within the cavity at the underside of the top wall with its opposite ends journaled in the end walls, a scale bar mounted within the cavity at the underside of the top wall parallel to the rigid rod with its ends journaled in the end walls, said scale bar being rotatable to present a selected scale uppermost, a series of pointer mounting blocks, transversely spaced bearing elements on each block containing aligned openings slidingly engaged with the rigid rod, links of equal length between each pair of pointer blocks pivotally connected at one end to each other and to the block midway between the bearing elements and at their other ends to each other midway between the adjacent pointer blocks, and pairs of pointers mounted to each pointer block, said pointers extending forwardly from the rigid rod in spaced parallel relation and comprising a scale pointer above the scale bar and a chart pointer below the scale bar in the plane of the bottom side of the instrument, said chart pointer extending beyond the end of the scale pointer so as to be visible on the surface of the chart, and means extending upwardly from the endmost pointer blocks through the slot in the top wall for extending and contracting the scale pointers along said scale bar and the chart pointers correspondingly along the chart.

2. A navigational instrument comprising a rigid elongate structure having top and bottom sides and containing in the bottom side a cavity defined along its long sides and ends by side and end walls, the edges of which lie in a common plane, said top side containing an elongate slot in communication with the cavity, a rigid traverse rod mounted in the cavity at the underside of the top wall below and parallel to the slot, a rigid scale bar mounted in the cavity at the underside of the top in spaced parallel relation to the rigid traverse bar for rotation about its longitudinal axis, scales on the scale bar, a series of pointers slidingly mounted on the traverse rod for movement therealong relative to the scale bar, said pointers comprising a scale pointer extending from the traverse bar over the scale bar, a chart pointer extending forwardly below the scale bar substantially in the plane of the edges of the side and end walls, pairs of links of equal length pivotally connected at one end to the adjacent pointers and at their other ends to each other, pins pivotally connecting the one end of the links to the pointers at points which lie on the longitudinal center line of the traverse bar, said pins extending upwardly from the traverse bar through the slot, and knobs mounted to the upper ends of the pins in the end pointers in frictional engagement with the top wall, said slot being wider than the diameters of the pins such as to provide a clearance along which the pins are free to move.

3. A navigational instrument according to claim 2, wherein the widths of the pointer blocks and the configuration of the links are such that when completely contracted the pointer blocks abut and the links are folded within the spaces between the centers of adjacent pointer blocks.

4. A navigational instrument according to claim 2, wherein the ends of the links are pivotally connected to the pivot blocks and to each other by pivot pins and said pivot pins are in the order of one-fourth of an inch in diameter.

5. A navigational instrument according to claim 2, wherein the distance between bearing elements on the pointer blocks is in the order of one-half inch.

6. A navigational instrument according to claim 2, wherein the scale bar is of rectangular cross-section and each side has on it a scale.

7. A navigational instrument according to claim 2, wherein the portion of the top of the instrument along the scale bar embodies a magnifying lens such as to enable matching the scale pointer with the indicia on the scale bar.

8. A navigational instrument according to claim 2, wherein the entire instrument is comprised of transparent material such that the chart pointers are visible on the chart simultaneously with observation of the scale pointers on the scale bar.

9. A navigational instrument comprising an elongate bar having a top, bottom and spaced parallel longitudinal edges, said bar being transparent and containing lengthwise thereof a narrow uniformly wide slot, a rigid rod mounted longitudinally of the bar at the bottom side parallel to the longitudinal edges a scale bar mounted at the bottom side of the bar parallel to and spaced from the rigid bar for rotation about its longitudinal axis to present a selected scale uppermost, a series of pointers, means slidingly mounting the pointers on the rigid rod for movement longitudinally thereof, links of equal length pivotally connected intermediate their ends to the pointers and at their ends intermediate the pointers to each other, said links forming in conjunction with the pointers a lazy tong linkage which functions to move the pointers equal distances along the scale bar, said pointers comprising vertically spaced pairs of parallel horizontally disposed scale and chart pointers, said scale pointers extending forwardly from the rod above the scale bar for movement therealong and said chart pointers extending forwardly from the rigid rod below the scale bar to substantially the longitudinal edge of the bar, means at the bottom side of the bar for supporting the bar above the surface of a chart on which it rests such that the scale pointers are close to the surface, means at the intermediate pivots slidingly engaged with the slot for guiding the pointers in translation and means at the opposite ends of the linkage extending upwardly through the slot by means of which the linkage may be extended and contracted.

10. A navigational instrument according to claim 9, wherein the means for anchoring the ends of the lazy tong device comprise pins on the end pointers extending upwardly through said slot in the top wall, knobs mounted on said pins and springs pressing the knobs against the top of the top wall.

11. A navigational instrument according to claim 9, wherein the scale bar is removably mounted at its end for replacement with a scale bar of different denomination.

12. A navigational instrument according to claim 9, wherein a compass rose is slidably mounted on one lone edge of the instrument for movement therealong.

13. A navigational instrument according to claim 9, comprising a compass rose and a mounting device detachably mounting the compass rose at one long edge for sliding movement along one side edge and for rotation about an axis at its center perpendicular to the plane of the lower side of the instrument.

14. A navigational instrument according to claim 9, comprising a compass rose and means attaching the compass rose to the instrument comprising grooves along the upper and lower edges of one long side of the bar, spring-biased jaws slidably engaged with said grooves, and means pivotally supporting the compass rose to one of the jaws in the plane of the bottom side of the instrument for rotation about an axis perpendicular to said bottom side.

15. A navigational instrument according to claim 9, comprising a compass rose and variation scale plate detachably mounted to one long side of the bar for sliding movement in unison therealong parallel to the bar and for rotation of the compass rose about an axis perpendicular to the bar.

16. A navigational instrument according to claim 15, wherein the compass rose and scale plate are mounted to said long side of the bar with a portion of the compass rose underlying the bar.

17. A navigational instrument according to claim 9, comprising a circular plate and a substantially rectangular plate having spaced parallel sides and arcuate ends concentric with the center of the circular plate, said circular plate and arcuate ends of the rectangular plate being graduated in degrees and means detachably supporting the circular plate and rectangular plate for movement in unison along one long side of the bar and for rotation of the circular plate about an axis perpendicular to the bar situated at the center of the circular plate and substantially midway between the ends and sides of the rectangular plate.

18. A navigational instrument according to claim 9, comprising a compass rose and variation scale plate and means mounting the compass rose and variation scale plate to one long side of the bar, said means comprising spring-pressed upper and lower jaws engageable with grooves along the long side of the bar so that it is slidable along said edge, said lower jaw containing a recess at its lower side parallel to the long side of the bar within which the variation scale plate is mounted with its lower side substantially flush with the lower side of the lower jaw and with its edges parallel to the bar, said plate having arcuate ends concentric with the center of the compass rose and being graduated in degrees, and means rotatably mounting the compass rose to the underside of the scale plate and to the lower jaw for rotation about an axis at the center of the compass rose perpendicular to the bar and substantially midway between the ends and sides of the scale plate, said means including a screw-threaded pin and friction nut threaded onto the pin.

* * * * *